United States Patent
Sharma

(10) Patent No.: US 11,436,266 B2
(45) Date of Patent: Sep. 6, 2022

(54) METHOD AND APPARATUS FOR PROCESSING INFORMATION OF A TERMINAL

(71) Applicant: SAMSUNG ELECTRONICS CO., LTD., Suwon-si (KR)

(72) Inventor: Anuj Sharma, Noida (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/984,065

(22) Filed: Aug. 3, 2020

(65) Prior Publication Data

US 2020/0364249 A1    Nov. 19, 2020

Related U.S. Application Data

(63) Continuation of application No. 14/160,860, filed on Jan. 22, 2014, now abandoned.

(30) Foreign Application Priority Data

Jan. 21, 2013   (IN) ............................. 254/CHE/2013
Oct. 24, 2013   (KR) ........................ 10-2013-0127294

(51) Int. Cl.
   *G06F 16/338*   (2019.01)
   *G06F 16/9038*  (2019.01)
   (Continued)

(52) U.S. Cl.
   CPC ........ *G06F 16/338* (2019.01); *G06F 16/9038* (2019.01); *H04M 1/2748* (2020.01); *H04M 1/2757* (2020.01)

(58) Field of Classification Search
   CPC .............. G06F 16/338; G06F 16/9038; H04M 1/2748; H04M 1/2757
   See application file for complete search history.

(56) References Cited

U.S. PATENT DOCUMENTS 5,923,327 A  * 7/1999  Smith ................. H04M 1/2757
                                                    715/784
6,084,951 A  * 7/2000  Smith ................. H04M 1/2757
                                                    379/93.17
(Continued)

FOREIGN PATENT DOCUMENTS

CN      102549577 A     7/2012
EP        1862895 A1    12/2007

OTHER PUBLICATIONS

Communication dated Jul. 15, 2019, from the Intellectual Property Office of India in counterpart application No. 254/CHE/2013.
(Continued)

*Primary Examiner* — Robert W Beausoliel, Jr.
*Assistant Examiner* — Susan F Rayyan
(74) *Attorney, Agent, or Firm* — Sughrue Mion, PLLC

(57) ABSTRACT

A method and apparatus for processing information of a terminal, is provided. The method includes parsing at least one message for at least one keyword and at least one phone number related to the at least one keyword; mapping the at least one keyword and the at least one phone number related to the at least one keyword and storing the at least one keyword and the at least one phone number related to the at least one keyword that have been mapped in a database; in response to a predetermined keyword being received as a search input, searching the database for the at least one phone number that has been mapped with the predetermined keyword; and displaying the at least one phone number related to the predetermined keyword that is found, on a display.

20 Claims, 8 Drawing Sheets

(51) Int. Cl.
*H04M 1/2748* (2020.01)
*H04M 1/2757* (2020.01)

(56) References Cited

U.S. PATENT DOCUMENTS

| | | | |
|---|---|---|---|
| 6,222,921 B1 | 4/2001 | Mugura et al. | |
| 6,442,263 B1* | 8/2002 | Beaton | H04M 1/576 379/142.04 |
| 6,449,475 B1 | 9/2002 | Chinnaswami | |
| 6,606,381 B1 | 8/2003 | Wunsch | |
| 7,007,239 B1 | 2/2006 | Hawkins et al. | |
| 7,082,576 B2 | 7/2006 | Shahine et al. | |
| 7,085,257 B1* | 8/2006 | Karves | H04M 3/42093 370/352 |
| 7,209,950 B2 | 4/2007 | Bennett et al. | |
| 7,688,967 B2 | 3/2010 | Patel et al. | |
| 7,707,276 B2 | 4/2010 | Brenes et al. | |
| 7,839,989 B2 | 11/2010 | Brown et al. | |
| 7,941,481 B1 | 5/2011 | Partovi et al. | |
| 8,027,442 B2 | 9/2011 | Crandell et al. | |
| 8,233,884 B2 | 7/2012 | Snyder | |
| 8,364,135 B2 | 1/2013 | Kim et al. | |
| 8,364,711 B2 | 1/2013 | Wilkins et al. | |
| 8,452,765 B2 | 5/2013 | Hoffman et al. | |
| 8,527,436 B2 | 9/2013 | Salaka et al. | |
| 8,571,528 B1* | 10/2013 | Channakeshava | H04M 3/42221 455/414.1 |
| 8,606,242 B2 | 12/2013 | Kedefors et al. | |
| 8,661,002 B2* | 2/2014 | Smith | G06Q 30/0269 707/694 |
| 8,718,684 B2 | 5/2014 | Ellis | |
| 8,832,561 B2* | 9/2014 | Nurminen | H04L 12/5692 715/739 |
| 8,838,569 B2 | 9/2014 | Vaananen | |
| 8,989,713 B2 | 3/2015 | Doulton | |
| 9,288,643 B2 | 3/2016 | Wang et al. | |
| 2004/0229644 A1 | 11/2004 | Heie et al. | |
| 2006/0248465 A1 | 11/2006 | Ryu et al. | |
| 2007/0037613 A1 | 2/2007 | Kim | |
| 2007/0067272 A1 | 3/2007 | Flynt et al. | |
| 2007/0130200 A1 | 6/2007 | Ogren | |
| 2007/0140460 A1 | 6/2007 | Cai et al. | |
| 2007/0173241 A1* | 7/2007 | Nah | H04M 1/72436 455/418 |
| 2007/0230374 A1* | 10/2007 | Altberg | H04L 63/0428 370/271 |
| 2008/0133580 A1* | 6/2008 | Wanless | H04M 1/72457 |
| 2008/0134088 A1* | 6/2008 | Tse | G06F 16/29 715/810 |
| 2008/0173241 A1 | 7/2008 | Priddy et al. | |
| 2008/0182627 A1 | 7/2008 | Lincoln | |
| 2008/0188202 A1 | 8/2008 | Maeng | |
| 2008/0194237 A1* | 8/2008 | Matyushev | H04M 1/2757 455/414.1 |
| 2008/0313182 A1* | 12/2008 | Vasa | G06F 3/0237 |
| 2009/0023472 A1 | 1/2009 | Yoo et al. | |
| 2009/0136013 A1* | 5/2009 | Kuykendall | H04M 1/575 379/142.17 |
| 2009/0186597 A1 | 7/2009 | Lin et al. | |
| 2009/0268892 A1 | 10/2009 | Wong et al. | |
| 2009/0300010 A1 | 12/2009 | Ratnakar | |
| 2010/0042662 A1 | 2/2010 | Mao | |
| 2010/0069045 A1 | 3/2010 | Grignani et al. | |
| 2010/0123401 A1 | 5/2010 | Park et al. | |
| 2010/0153881 A1 | 6/2010 | Dinn | |
| 2010/0203874 A1* | 8/2010 | Scott | H04M 1/56 455/415 |
| 2010/0279667 A1 | 11/2010 | Wehrs et al. | |
| 2010/0306185 A1* | 12/2010 | Smith | G06Q 30/0269 707/709 |
| 2011/0003584 A1 | 1/2011 | Noma et al. | |
| 2011/0078184 A1 | 3/2011 | Song et al. | |
| 2011/0092227 A1 | 4/2011 | Phukan | |
| 2011/0138294 A1 | 6/2011 | Jeon et al. | |
| 2011/0228913 A1 | 9/2011 | Cochinwala et al. | |
| 2011/0244878 A1 | 10/2011 | Kochetkov et al. | |
| 2012/0197981 A1* | 8/2012 | Chan | G06Q 30/0276 709/203 |
| 2013/0137479 A1 | 5/2013 | Baek et al. | |
| 2013/0137484 A1 | 5/2013 | Torres | |
| 2013/0218902 A1 | 8/2013 | Vendrow et al. | |
| 2014/0095477 A1 | 4/2014 | Wadhwa | |
| 2014/0143265 A1* | 5/2014 | Kim | G06Q 50/01 707/758 |
| 2014/0149308 A1 | 5/2014 | Ming | |
| 2014/0258325 A1 | 9/2014 | Fan | |
| 2015/0161240 A1* | 6/2015 | Rebbapragada | G06F 16/2428 707/740 |
| 2016/0037331 A1* | 2/2016 | Vernon | G06Q 10/107 455/414.1 |
| 2019/0281151 A1* | 9/2019 | Lim | H04M 1/2757 |

OTHER PUBLICATIONS

Communication dated Feb. 28, 2020, issued by the Korean Intellectual Property Office in corresponding Korean Application No. 10-2013-0127294.

Communication dated Apr. 27, 2022, issued by the Korean Intellectual Property Office in Korean Patent Application No. 10-2021-0193438.

* cited by examiner

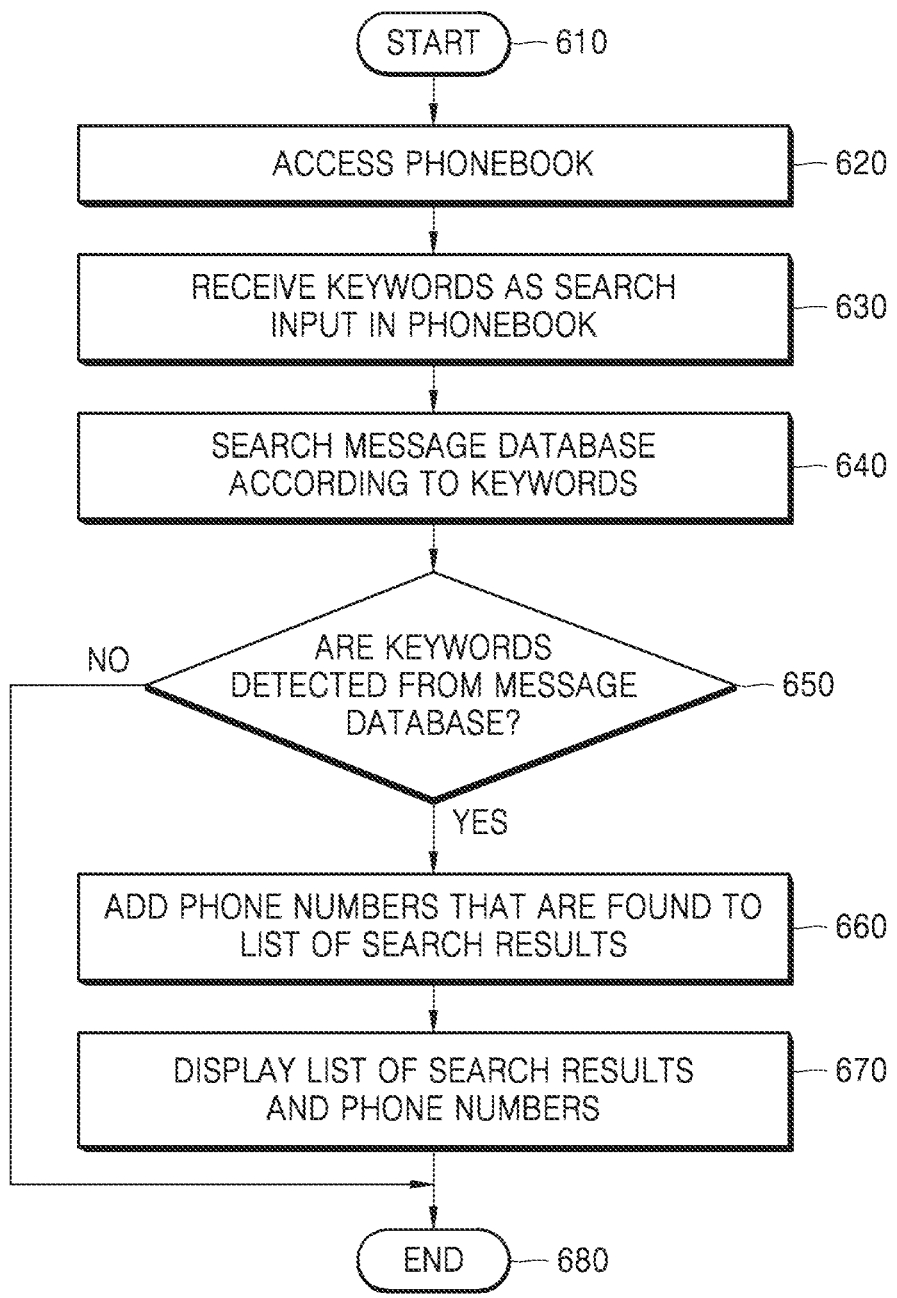

METHOD AND APPARATUS FOR PROCESSING INFORMATION OF A TERMINAL

RELATED APPLICATIONS

This application is a continuation of U.S. application Ser. No. 14/160,860 filed Jan. 22, 2014, which claims priority from Korean Patent Application No. 10-2013-0127294, filed on Oct. 24, 2013, and Indian Patent Application No. 254/CHE/2013, filed on Jan. 21, 2013, in the Indian Intellectual Property Office, the disclosures of which are incorporated herein by reference, in their entireties.

BACKGROUND

1. Technical Field

One or more exemplary embodiments relate to a method and an apparatus for processing information of a terminal having a display. More particularly, the exemplary embodiments relate to a method and an apparatus for processing information that improves phonebook features of a terminal.

2. Description of the Related Art

Terminals, such as cellular phones and digital TVs, generally include memory and may be used to communicate with each other by using messages. The terminals also include a phonebook with a list of contact numbers. In general, a user searches for a phone number in the phonebook by inputting a name of a contact number. However, phonebook features according to the related art only include contact numbers that are saved by the user or from received business cards. Therefore, there is a need for a method and an apparatus for improving phonebook features of a terminal.

SUMMARY

One or more exemplary embodiments include a method and an apparatus for processing information that improves phonebook features of a terminal.

Additional aspects will be set forth in part in the description which follows and, in part, will be apparent from the description, or may be learned by practice of the exemplary embodiments.

According to one or more exemplary embodiments, a method of processing information is provided. The method includes parsing at least one message for at least one keyword and at least one phone number related to the at least one keyword; mapping the at least one keyword and the at least one phone number related to the at least one keyword and storing the at least one keyword and the at least one phone number related to the at least one keyword that have been mapped in a database; in response to a predetermined keyword being received as a search input, searching the database for the at least one phone number that has been mapped with the predetermined keyword; and displaying on a display the at least one phone number related to the predetermined keyword that is found.

The parsing may include receiving the at least one message, and parsing text of the at least one message to extract the at least one keyword and the at least one phone number related to the at least one keyword.

The storing may include mapping the at least one keyword and the at least one phone number related to the at least one keyword, which are parsed; and adding the at least one keyword and the at least one phone number that have been mapped to the database.

The searching may include detecting whether or not a database item that corresponds to the predetermined keyword received from the database is detected; adding a phone number related to the keyword to a list of search results, in response to the database item that corresponds to the predetermined keyword being detected; and finishing the searching, in response to the database item that corresponds to the predetermined keyword not being detected.

The displaying may include displaying a list of search results that include the at least one phone number related to the at least one keyword.

Displaying on the display a phone number that is communicated at least once from among the at least one phone number that is found may be further included.

Communication details related to the phone number may be further included on the display.

The communication details may include at least one of communication time, a communication type and the number of communication times.

The communication type may include at least one of an incoming call or message, an outgoing call or message and a missed call.

Displaying the at least one phone number that is found on the display, wherein a name tagged image linked to the at least one phone number that is found may be further included.

The name tagged image may display a menu which includes a call option and communication details.

According to one or more exemplary embodiments, an apparatus of processing information of a terminal is provided. The apparatus includes a message parser configured to parse at least one message for at least one keyword and at least one phone number related to the at least one keyword; a database configured to store the at least one keyword and the at least one phone number related to the at least one keyword that are parsed by the message parser; a keyword searcher configured to search the database for the at least one phone number related to the at least one keyword; and an information output configured to output on a display, the at least one phone number that is found.

The information output may be further configured to output on a display a phone number that is communicated at least once as well as communication details.

The information output may further output a phone number on a display, which is linked to a name tagged image.

According to one or more exemplary embodiments, a terminal is configured to include a key input to enter keywords; a display configured to display information search results according to the keywords; and an information processor configured to parse at least one message for at least one keyword and at least one phone number related to the at least one keyword; a storage configured to store in a database the at least one keyword and the at least one phone number related to the at least one keyword; a keyword searcher configured to search the database for at least one phone number that is related to a predetermined keyword, in response to the predetermined keyword being received as a search input; and a display configured to display on the display the at least one phone number related to the predetermined keyword that is found.

The information processor may include a message parser configured to parse the at least one message for the at least one keyword and the at least one phone number related to the at least one keyword; the database storing the at least one keyword and the at least one phone number related to the at least one keyword that are parsed by the message parser; a keyword searched configured to search the database for the at least one phone number related to the at least one keyword; and an information output which outputs the at least one phone number that is found.

The information processor may be configured to display a phone number that is communicated at least once, together with communication details.

The information processor may be configured to link the at least one phone number that is found to a name tagged image that displays a menu having a call option and communication details, and displays the communication details.

An aspect of an exemplary embodiment may further provide an apparatus for processing information of a terminal, the apparatus including: a message parser configured to parse at least one message for at least one keyword and at least one phone number related to the at least one keyword; a keyword searcher configured to search a database for at least one phone number related to the at least one keyword; and an information output configured to output on a display the at least one phone number that is found.

The apparatus may further include a database configured to store the at least one keyword and the at least one phone number related to the at least one keyword that are parsed by the message parser.

The information output may be further configured to output on a display a phone number that is communicated at least once together with communication details.

In addition, the information output may be further configured to output a phone number on the display, which is linked to a name tagged image.

BRIEF DESCRIPTION OF THE DRAWINGS

These and/or other aspects will become apparent and more readily appreciated from the following description of the exemplary embodiments, taken in conjunction with the accompanying drawings in which:

FIG. 6 is a detailed flowchart which illustrates a method of processing information of a terminal, according to an exemplary embodiment;

DETAILED DESCRIPTION OF THE EXEMPLARY EMBODIMENTS

Figure 1:
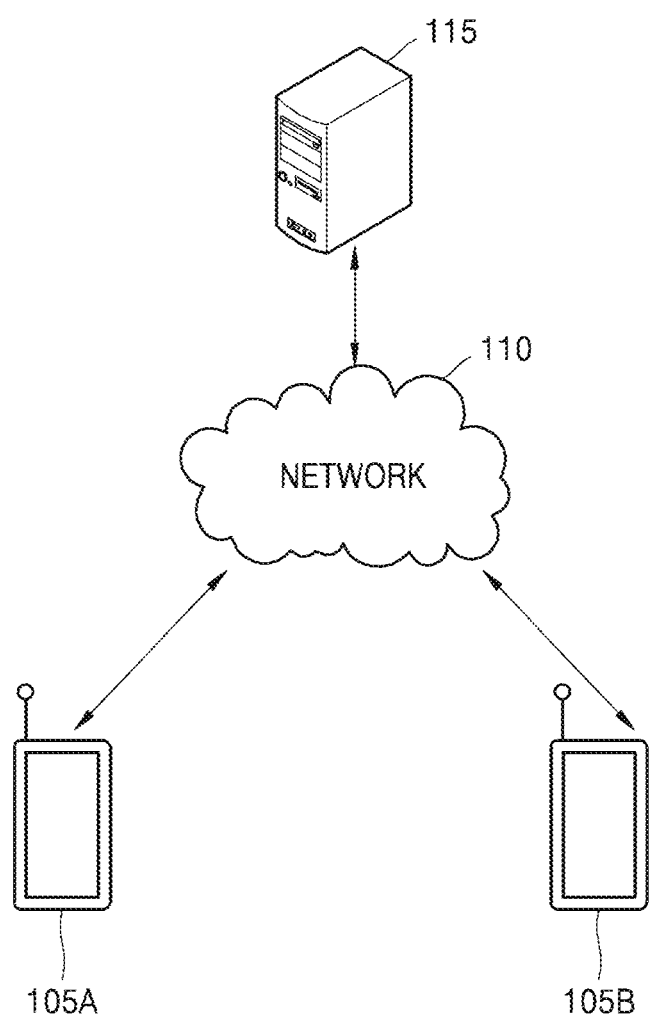
FIG. 1 is a view illustrating an environment that may be implemented according to an exemplary embodiment.

Reference will now be made in detail to the exemplary embodiments, examples of which are illustrated in the accompanying drawings, wherein like reference numerals refer to like elements throughout. In this regard, the exemplary embodiments may have different forms and should not be construed as being limited to the descriptions set forth herein. Accordingly, the exemplary embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

It will be understood that although the terms "first", "second", etc. may be used herein to describe various components, these components should not be limited by these terms. These components are only used to distinguish one component from another.

The terms used in the exemplary embodiments are selected to describe certain exemplary embodiments, and are not used to limit the spirit and scope of the exemplary embodiments. The terms in the exemplary embodiments are selected as general terms used currently as widely as possible regarding functions of elements in the exemplary embodiments. However, in specific cases, terms arbitrarily selected by the applicant are also used, and in such cases, the meanings are mentioned in the corresponding detailed description section, so the exemplary embodiments should be understood not by literal meanings of the terms but by given meanings of the terms.

As used herein, the singular forms "a," "an" and "the" are intended to include the plural forms as well, unless the context clearly indicates otherwise. It will be further understood that the terms "comprises" and/or "comprising" used herein specify the presence of stated features, numbers, processes, operations, components, elements, or a combination thereof, but do not preclude the presence or addition of one or more other features, numbers, processes, operations, components, elements, or a combination thereof.

FIG. 1 is a view which illustrates an environment that may be implemented according to an exemplary embodiment.

The environment includes one or more terminals, for example, a first terminal 105A and a second terminal 105B, a network 110, and a server 115. The first and second terminals 105A and 105B are connected to each other, and to the server 115 via the network 110. Examples of the terminal include, but are not limited to, a smart phone, a mobile device, a personal digital assistant (PDA), a tablet device, and a laptop. Examples of the network 110 include, but are not limited to, a local area network (LAN), a wide area network (WAN), and a wireless network.

The first and second terminals 105A and 105B may be controlled by respective users.

The first terminal 105A receives messages from various terminals connected to the network 110, for example, the second terminal 105B.

The first terminal 105A parses the messages that are received for keywords and at least one phone number related to the keywords.

The first terminal 105A adds the keywords and the at least one phone number related to the keywords to a message database.

A user enters the keywords to the first terminal 105A as a search input related to a phonebook. Then, the first terminal 105A searches the message database for the keywords, and adds phone numbers related to the keywords from the message database to a list of search results. The first terminal 105A displays the list of search results for the user. The first terminal 105A is described in detail with reference to FIG. 2.

Figure 2:
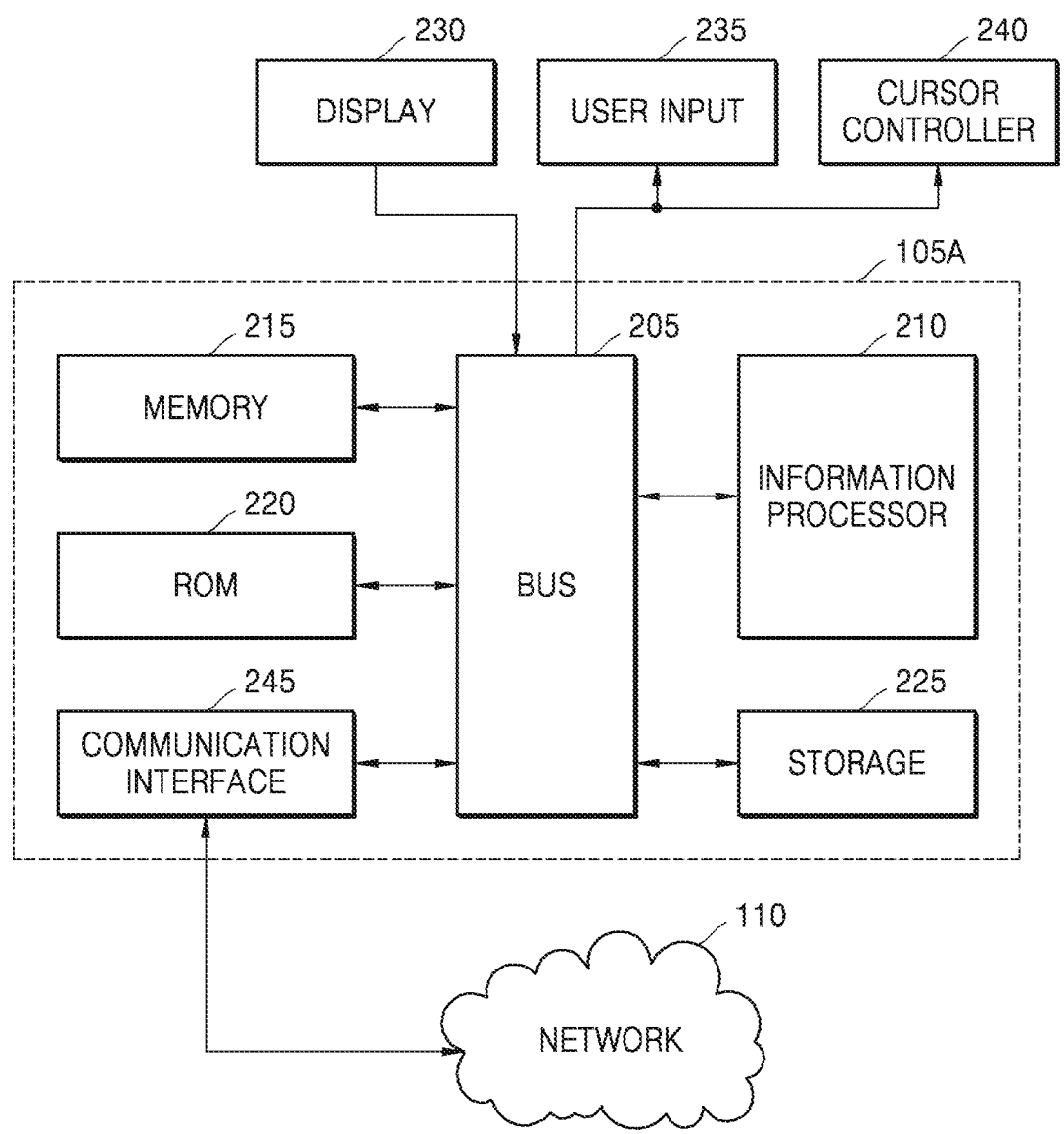
FIG. 2 is a block diagram of a first terminal according to an exemplary embodiment.

FIG. 2 is a block diagram of the first terminal 105A according to an exemplary embodiment.

The first terminal 105A includes a bus 205 or other communication mechanism for communicating information, and an information processor 210 that is coupled to the bus 205 and processes information. Also, the first terminal 105A includes a memory 215, for example, a random access memory (RAM) or other dynamic storage device, which is coupled to the bus 205 and stores commands to be executed by the information processor 210. The memory 215 may be used for storing temporary variables or other intermediate information while the information processor 210 is executing the commands. The first terminal 105A further includes a read only memory (ROM) 220 or other static storage device, which is coupled to the bus 205 and stores static information and commands for the information processor 210.

The first terminal 105A includes a storage 225; for example, a magnetic disk or an optical disk, which is coupled to the bus 205.

The first terminal 105A includes a display 230 that is connected to the bus 205, for example, a cathode ray tube (CRT) that may display search results related to information regarding the keywords. An user input 235, which functions as a user input device, includes alphanumeric keys and function keys, and transmits information and command selections to the information processor 210 via the bus 205. Another type of user input device is a cursor controller 240, for example, a mouse, a trackball, or cursor direction keys, that transmits direction information and command selections to the information processor 210, and controls cursor movement on the display 230.

The first terminal 105A may implement various information processes by using the information processor 210.

In some exemplary embodiments, the information processor 210 executes the commands that are stored in the memory 215. The commands may be read into the memory 215 from another computer-readable medium, such as the storage 225.

The term "computer-readable storage medium" refers to any medium that participates in providing data that causes a computer to perform a certain function. According to an exemplary embodiment that is implemented by using the first terminal 105A, various computer-readable media are involved, for example, in providing commands to the information processor 210 for execution. The computer-readable medium may be a storage medium, either volatile or non-volatile. A volatile medium includes, for example, a dynamic memory device, such as the memory 215. A non-volatile medium includes, for example, an optical or magnetic disk, such as the storage 225. All such media must be a type which enables the commands executed by the media to be detected by a physical mechanism that reads the commands into the computer.

Common forms of computer-readable media include, for example, floppy disks, hard disks, magnetic tapes, or any other magnetic media; CD-ROMs, any other optical media, punch cards, paper tapes, any other physical media with patterns of holes, RAMs, programmable read-only memories (PROMs), electrically programmable read-only memories (EPROMs), FLASH-EPROMs, or any other memory chips or cartridges.

In another exemplary embodiment, the computer-readable media may be transmission media including coaxial cables, copper wires, optical fibers, and wires that include the bus 205.

The transmission media may also have the form of acoustic or light waves, such as those generated during radio wave and infrared data communications. Examples of the computer-readable media include, but are not limited to, carrier waves as described hereinafter, or any other media from which the first terminal 105A may read. For example, the commands may initially be executed on a magnetic disc of a remote computer. The remote computer may load the commands into a dynamic memory, and transmit the commands over a telephone line via a modem. The modem may receive the data on the telephone line, and use an infrared transmitter to convert the data to infrared signals. An infrared detector may receive data transmitted by the infrared signals. The bus 205 transmits the commands and the data to the memory 215. The information processor 210 receives and executes the commands from the bus 205. The commands may be selectively stored in the storage 225 either before or after execution by the information processor 210. All such media must be a type of enabling the commands executed by the media to be detected by a physical mechanism that reads the commands into the computer.

The first terminal 105A includes a communication interface 245 that is coupled to the bus 205. The communication interface 245 uses two-way data communication and thus connects the first and second terminals 105A and 105B, via the network 110. For example, the communication interface 245 may be a modem or an integrated services digital network (ISDN) card for providing data communication connection to a corresponding type of a telephone line. As another example, the communication interface 245 may be a LAN card for providing data communication connection to a compatible LAN. In such an implementation, the communication interface 245 transmits and receives electrical, electronic, or optical signals that transfer digital data stream representing various types of information.

The information processor 210 in the first terminal 105A parses text of the messages. According to an exemplary embodiment, the information processor 210 analyzes text of a short message service (SMS) message, and separates keywords from the text of the SMS message so as to extract relevant information from the SMS message. Also, the information processor 210 includes message database that stores the messages, the keywords, and at least one phone number related to the keywords. The information processor 210 maps the keywords and a phone number of sender or a relevant phone number in the SMS message, and updates mapping information in the message database.

The information processor 210 receives the keywords as the search input in the phonebook of the first terminal 105A. The information processor 210 searches the message database according to the keywords, and adds the at least one phone number related to the keywords from the message database to the list of search results. Then, the, information processor 210 displays the list of the search results.

Figure 3:
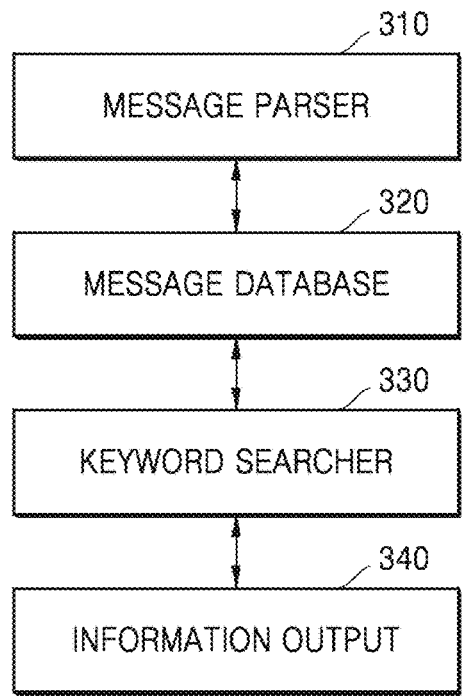
FIG. 3 is a detailed block diagram of an information processor of FIG. 2.

FIG. 3 is a detailed block diagram of the information processor 210 of FIG. 2.

The information processor 210 of FIG. 3 includes a message parser 310, a message database 320, a keyword searcher 330, and an information output 340.

In response to the messages being received, the message parser 310 parses the text of the messages for the keywords and the at least one phone number related to the keywords.

The message database 320 stores the keywords and the at least one phone number related to the keywords, which are parsed by the message parser 310.

In response to the user entering the keywords as the search input to the keyword searcher 330, the keyword searcher 330 searches the message database 320 for the at least one phone number related to the keywords.

The information output 340 outputs on a display a search result that includes the at least one phone number that is searched by the keyword searcher 330.

Figure 4:
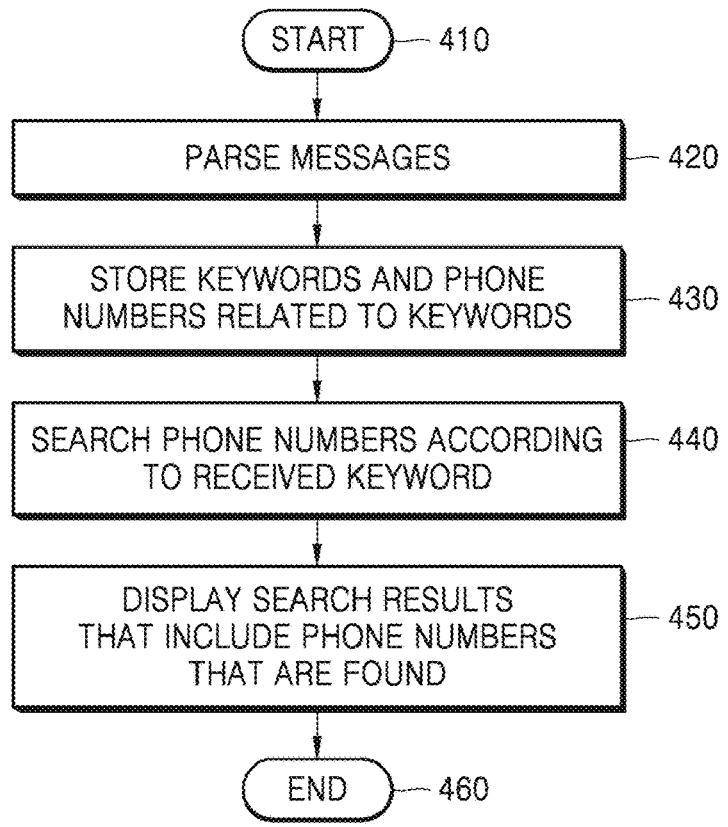
FIG. 4 is a flowchart illustrating a method of processing information of a terminal, according to an exemplary embodiment.

FIG. 4 is a flowchart which illustrates a method of processing information of a terminal, according to an exemplary embodiment.

The method of processing information of FIG. 4 includes an operation of updating the message database (operations 420 and 430) and an operation of searching information (operations 440 and 450). The method starts at operation 410.

In operation 420, the terminal receives messages such as the SMS messages, and parses text of the messages for keywords and at least one phone number related to the keywords.

In operation 430, the terminal maps the keywords and the at least one phone number which are parsed from the messages, and stores the parsed keywords and phone numbers in the message database 320.

In operation 440, in response to the user selecting an information search function, the terminal accesses the phonebook, and in response to the user entering the keywords as the search input in the phonebook, the terminal searches the at least one phone number that is mapped with the keywords in the message database.

In operation 450, in response to the message database being searched for keywords, the terminal adds the at least one phone number related to the keywords to the list of search results, and displays the list of search results that include the at least one phone number, that are found.

According to another exemplary embodiment, the terminal may display phone numbers that are communicated at least once, together with communication details. The communication details may include, but are not limited to, communication time, a type of communication, and the number of communication times.

According to another exemplary embodiment, the terminal may integrate the phonebook with images, and display name tagged images on the display. For example, the terminal may generate name tagged images that correspond to the keywords, and link phone numbers that are found, respectively, to the name tagged images.

The method ends in operation 460.

As a result, according to an exemplary embodiment, the user may only enter the keywords and automatically search for phone numbers related to the SMS message. Accordingly, information search time may be reduced.

Figure 5:
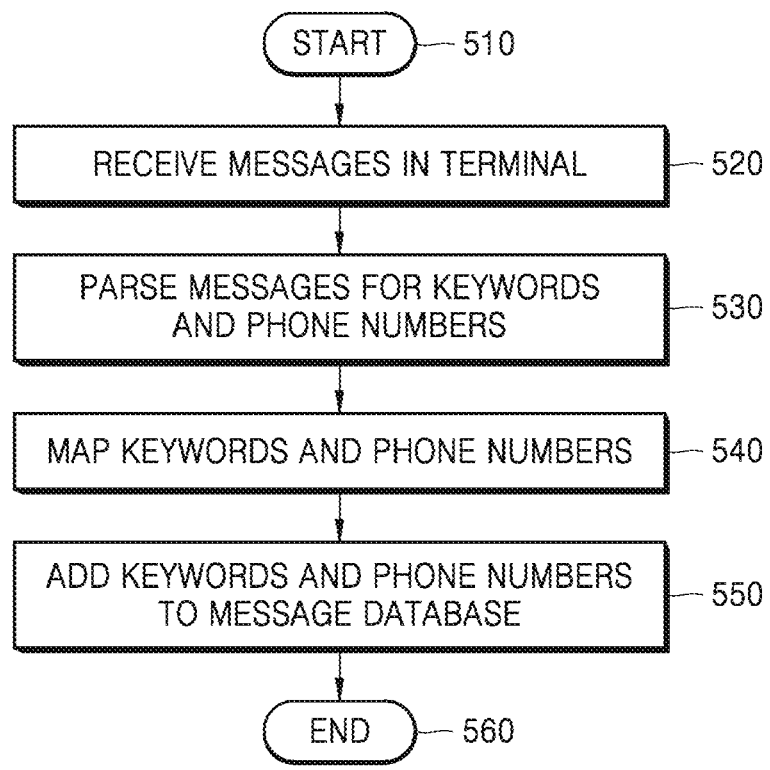
FIG. 5 is a detailed flowchart which illustrates a method of updating a message database, according to an exemplary embodiment.

FIG. 5 is a detailed flowchart which illustrates a method of updating the message database 320, according to an exemplary embodiment. The method starts in operation 510.

In operation 520, the terminal receives the messages. For example, the messages may be promotion messages that are received as SMS messages. As another example, the messages may be e-mails, multimedia mails, and a chat log present on an electronic display device.

In operation 530, the terminal parses the text of the messages for the keywords and the at least one phone number related to the keywords. Parsing may be performed by a message parser. For example, suppose that a message is received from a "pest control company" having keywords such as "pest" and "control." Then, the terminal parses the message for the keywords "pest" and "control," and a phone number of a sender.

In operation 540, the terminal maps the keywords and the at least one phone number related to the keywords which are parsed.

In operation 550, the terminal adds the keywords and the at least one phone number related to the keywords, which are generated by the mapping process, to the message database 320.

The method ends in operation 560.

FIG. 6 is a detailed flowchart which illustrates a method of processing information of the terminal, according to an exemplary embodiment. The method starts in operation 610.

In operation 620, the terminal accesses the phonebook and/or a list of contact numbers.

In operation 630, the terminal receives from the user the keywords as the search input in the phonebook.

In operation 640, the terminal searches the message database 320 according to the keywords that are input by the user.

In operation 650, the terminal determines whether or not a database item that corresponds to the keywords is located from the message database 320.

In operation 660, in response to the terminal finding the database item that corresponds to the keywords, the terminal adds the at least one phone number related to the keywords to the list of search results. The at least one phone number is available only during a phonebook search, and are not added to the phonebook.

In operation 670, the terminal displays the at least one phone number related to the keywords in the list of search results. The user may use the at least one phone number that is displayed to call or send an SMS message, or may add the at least one phone number directly from the search results to the phonebook.

In operation 680, in response to the terminal not finding the database item that corresponds to the keywords, the method ends.

The user may use the at least one phone number that is displayed to call or may send a text message.

In some from the user embodiments, the message database 320 may be included in the first terminal 105A, the network 110, or a cloud. The message database 320 may hence be searched for the keywords. Also, the at least one phone number in the list of search results is also retrieved from the message database 320.

For example, suppose that the message database 320 stores a keyword "Courier" and a phone number related to the keyword, which are parsed from a message received from a company named "Courier." The user enters "courier" as an input keyword on a search input box of the phonebook. The message database 320 is searched for the keyword "Courier." The first terminal 105A displays a list of search results that includes phone numbers that are mapped to the keyword "Courier."

In some from the user embodiments, from among phone numbers that are found, at least one frequently communicated phone number is provided to the user, along with communication details. The communication details include, but are not limited to, communication time, a type of communication, and the number of communication times. Examples of the communication type may include, but are not limited to, an incoming call or message, an outgoing call or message and a missed call.

In some from the user embodiments, the phonebook of the terminal may include a tab for showing frequently communicated phone numbers or contact numbers on the screen. By including the tab, it may be unnecessary to search for a contact number from the phone numbers or from a recent log history. Also, the terminal monitors frequency of communication with the contact numbers in the phonebook, and maintains a list of the frequently communicated phone numbers. The list dynamically changes as the frequency of communication related to the contact numbers in the phonebook changes.

In some from the user embodiments, the communication details are provided for each contact number in the phonebook. In some from the user embodiments, the communication details may be provided for each contact number in the phonebook in response to the user clicking the communication details or making a gesture on a touch screen.

In some exemplary embodiments, the phonebook is integrated with images to provide name tagged images. In some from the user embodiments, the images may be present in a phone gallery, an e-mail client, or on a web browser of the terminal. The name tagged images may display a menu having a call option and the communication details. For example, the menu may be translucent. In response to the user having name tagged an image in the phone gallery, in response to the image being opened; the terminal may search the phonebook for a contact number related to the name tag, retrieve the communication details, and display a search result in the phone gallery itself.

Figure 7A:
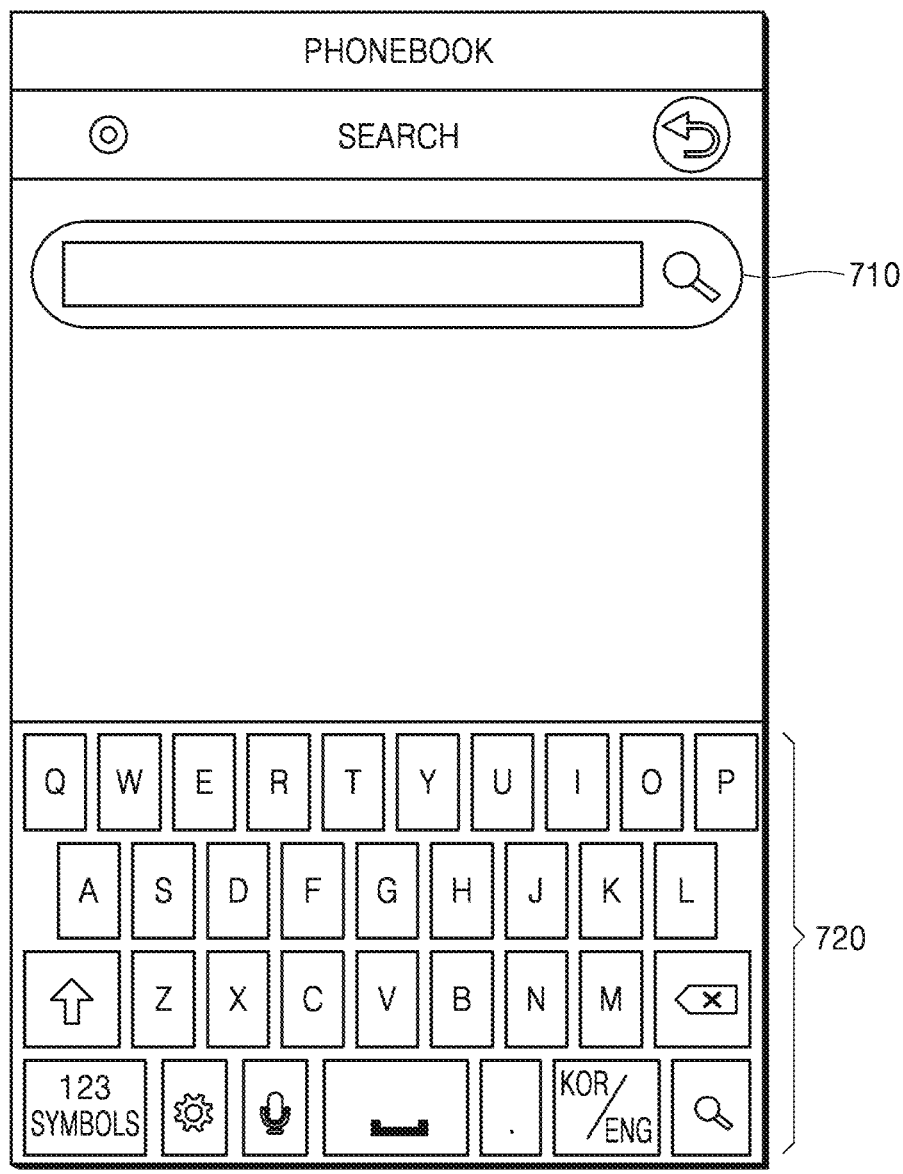
FIGS. 7A and 7B are views which illustrate an example of an information processing screen, according to an exemplary embodiment.
Figure 7B:
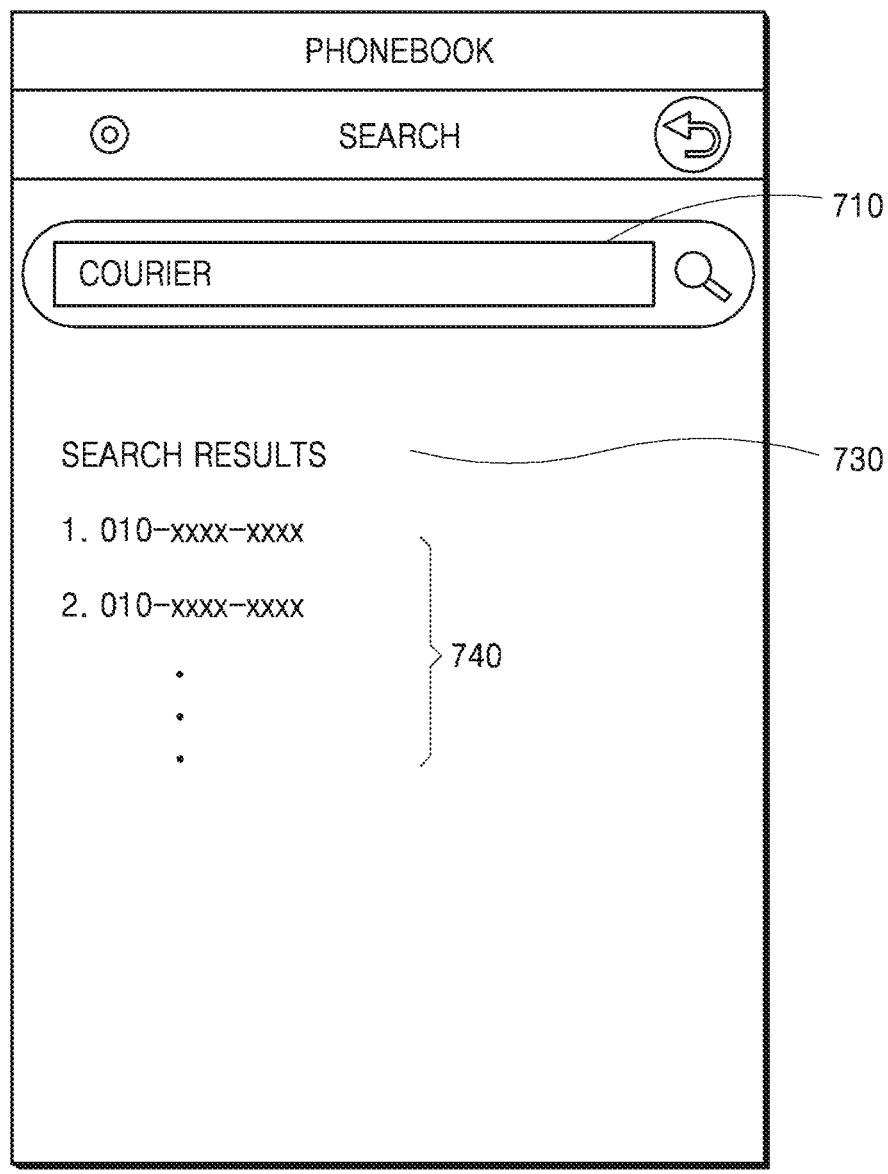

FIGS. 7A and 7B are views illustrating an example of an information processing screen, according to an exemplary embodiment.

Referring to FIG. 7A, the terminal accesses the phonebook, and activates a search box 710. The user uses input keys 720 to enter a desirable keyword, such as "Courier." In response to the user entering the keyword, the terminal displays the keyword, such as "Courier," on the search box 710.

Referring to FIG. 7B, the terminal searches the message database for the keyword, such as "Courier," that is input in the search box 710. The terminal adds at least one phone number 740 related to the keyword found in the message database to search results 730. Finally, the terminal displays the at least one phone number 740 included in the search results 730. The user may use the at least one phone number 740 that are displayed to call or send a text message.

Figure 8:
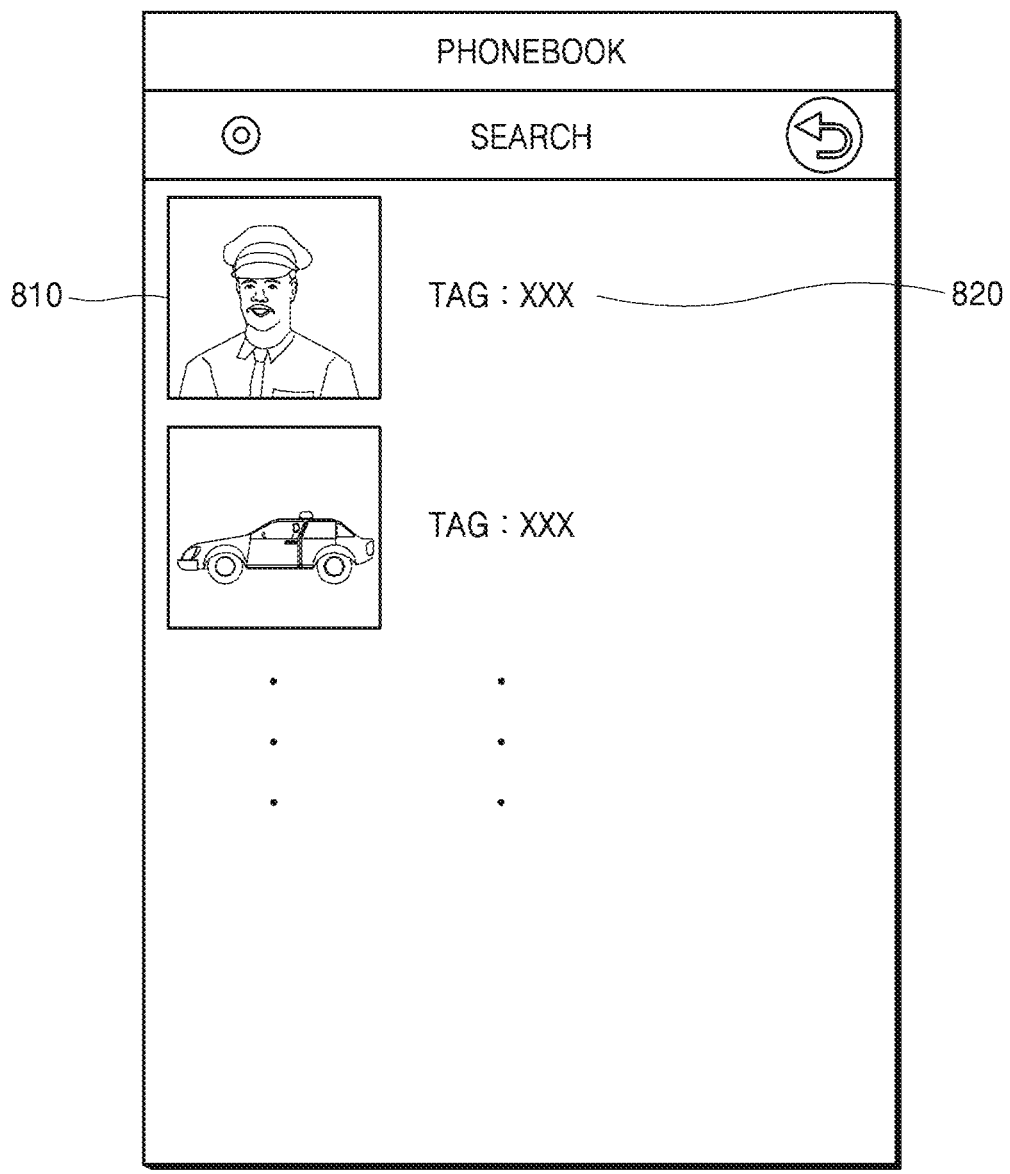
FIG. 8 is a view which illustrates an example of an information processing screen, according to another exemplary embodiment.

FIG. 8 is a view which illustrates an example of an information processing screen, according to another exemplary embodiment.

Referring to FIG. 8, the terminal generates name tagged images 810, links the at least one phone number 740 found in FIG. 7B and the name tagged images 810, and displays the name tagged images 810 that are linked. A name tag 820 may be a keyword. Accordingly, in response to the user selecting an image, the terminal searches for a phone number related to a name tag which corresponds to the image, and then displays the phone number that is found.

As described above, according to the one or more of the above exemplary embodiments, an intelligent execution of phonebook features of a terminal is enabled. Therefore, a user may use data from received messages when performing a phonebook search. Also, in the exemplary embodiments, the phonebook features are improved by providing the user with frequently communicated phone numbers and communication details. In addition, social networking is enabled by linking the communication details to corresponding contact numbers in the phonebook.

In addition, other exemplary embodiments can also be implemented through computer readable code/instructions in/on a medium, e.g., a computer readable medium, to control at least one processing element to implement any above described exemplary embodiment. The medium can correspond to any medium/media permitting the storage and/or transmission of the computer readable code.

The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as Internet transmission media. Thus, the medium may be such a defined and measurable structure including or carrying a signal or information, such as a device carrying a bit stream according to one or more exemplary embodiments. The media may also be a distributed network, so that the computer readable code is stored/transferred and executed in a distributed fashion. Furthermore, the processing element could include a processor or a computer processor, and processing elements may be distributed and/or included in a single device.

It should be understood that the exemplary embodiments described therein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope of the present invention as defined by the following claims.

What is claimed is:

1. A method performed by an electronic device including a touch display, the method comprising:

receiving a call from a first external device, the call including a first phone number corresponding to the first external device;

receiving, via the touch display, a first user input for storing the first phone number;

based on the receiving the first user input, storing, via a phonebook application, a first keyword and the first phone number in a phonebook of the electronic device, the first keyword being associated with the first phone number in the phonebook of the electronic device;

receiving a first message from a second external device, the first message including a second keyword and a second phone number;

identifying the second keyword and the second phone number from the received first message to map the second phone number to the second keyword;

storing the second keyword and the second phone number in a database of the electronic device, wherein the second keyword is associated with the second phone number in the database of the electronic device, wherein the database is distinct from the phonebook;

storing information regarding mapping of the second keyword;

receiving a second message from a third external device, the second message including the second keyword and a third phone number;

identifying the second keyword and the third phone number from the received second message to map the third phone number to the second keyword;

storing the second keyword and the third phone number in a database of the electronic device, wherein the second keyword is associated with the third phone number in the database of the electronic device;

updating the information regarding the mapping of the second keyword;

receiving, via the touch display, a second user input for accessing the phonebook, wherein the phonebook comprises one or more keywords including the first keyword and one or more phone numbers including the first phone number;

based on the receiving the second user input, providing, by the phonebook application, a search interface for the phonebook on the touch display of the electronic device;

receiving, via the search interface of the phonebook application, a third keyword as a search input for searching the phonebook of the electronic device;

in response to the receiving the third keyword as the search input for searching the phonebook, searching the phonebook and the database for the received third keyword;

based on the searching the phonebook and the database based on the third keyword, determining that the third keyword corresponds to the second keyword stored in the database of the electronic device; and based on determining that the third keyword corresponds to the second keyword, providing, by the phonebook application, the second phone number and the third phone number associated with the second keyword in the database as a search result, the second phone number and the third phone number being stored in the database and not stored in the phonebook, wherein the second phone number and the third phone number in the database are not provided by the phonebook application before a phonebook search;

receiving, via the touch display, a third user input for selecting one of the second phone number or the third phone number to be added to the phonebook of the electronic device; and based on the receiving the third user input, storing the selected phone number in the phonebook of the electronic device.

2. The method of claim 1, wherein the provided second phone number of the database is available as the search result and is not stored in the phonebook of the electronic device before receiving the third user input.

3. The method of claim 1, wherein the provided second and third phone numbers are not displayed in a default screen of the phonebook application before the provided second and third phone numbers are stored in the phonebook of the electronic device by receiving the third user input.

4. The method of claim 1, wherein the first and second messages are e-mail messages.

5. The method of claim 1, wherein the second keyword is mapped to the second and third phone numbers and the first and second messages.

6. The method of claim 1, wherein the second keyword corresponds to a first sender of the first message and a second sender of the second message.

7. The method of claim 1, wherein the second phone number is a phone number of a first sender of the first message, the third phone number is a phone number of a second sender of the second message, and the method further comprises:

providing a call option for making a phone call to the one of the first sender or the second sender.

8. The method of claim 1, further comprising:
displaying communication details related to the one of the second phone number or the third phone number.

9. The method of claim 8, wherein the communication details include a communication time of the one of the first message or the second message, and a type of communication of the one of the first message or the second message.

10. The method of claim 1, wherein an image is addable to a contact of the selected and stored phone number in the phonebook of the electronic device.

11. An electronic device comprising:
a touch display;
a memory storing instructions; and
at least one processor configured to execute the instructions to:
receive a call from a first external device, the call including a first phone number corresponding to the first external device;
receive, via the touch display, a first user input for storing the first phone number;
based on the receiving the first user input, store, via a phonebook application, a first keyword and the first phone number in a phonebook of the electronic device, the first keyword being associated with the first phone number in the phonebook of the electronic device;
receive a first message from a second external device, the first message including a second keyword and a second phone number;
identify the second keyword and the second phone number from the received first message to map the second phone number to the second keyword;
store the second keyword and the second phone number in a database of the electronic device, wherein the second keyword is associated with the second phone number in the database of the electronic device, wherein the database is distinct from the phonebook;
store information regarding mapping of the second keyword;
receive a second message from a third external device, the second message including the second keyword and a third phone number;
identify the second keyword and the third phone number from the received second message to map the third phone number to the second keyword;
store the second keyword and the third phone number in a database of the electronic device, wherein the second keyword is associated with the third phone number in the database of the electronic device;
update the information regarding the mapping of the second keyword;
receive, via the touch display, a second user input for accessing the phonebook, wherein the phonebook comprises one or more keywords including the first keyword and one or more phone numbers including the first phone number;
based on the receiving the second user input, provide, by the phonebook application, a search interface for the phonebook on the touch display of the electronic device;
receive, via the search interface of the phonebook application, a third keyword as a search input for searching the phonebook of the electronic device;
in response to the receiving the third keyword as the search input for searching the phonebook, search the phonebook and the database for the received third keyword;
based on the searching the phonebook and the database based on the third keyword, determine that the third keyword corresponds to the second keyword stored in the database of the electronic device;

based on the determining that the third keyword corresponds to the second keyword, provide, by the phonebook application, the second phone number and the third phone number associated with the second keyword in the database as a search result, the second phone number and the third phone number being stored in the database and not stored in the phonebook, wherein the second phone number and the third phone number in the database are not provided by the phonebook application before a phonebook search;

receive, via the touch display, a third user input for selecting one of the second phone number or the third phone number to be added to the phonebook of the electronic device; and based on the receiving the third user input, store the second phone number in the phonebook of the electronic device.

12. The electronic device of claim 11, wherein the provided second phone number of the database is available as the search result and is not stored in the phonebook of the electronic device before receiving the third user input.

13. The electronic device of claim 11, wherein the provided second and third phone numbers are not displayed in a default screen of the phonebook application before the provided second and third phone numbers are stored in the phonebook of the electronic device by receiving the third user input.

14. The electronic device of claim 11, wherein the first and second messages are e-mail messages.

15. The electronic device of claim 11, wherein the second keyword is mapped to the second and third phone numbers and the first and second messages.

16. The electronic device of claim 11, wherein the second keyword corresponds to a first sender of the message and a second sender of the second message.

17. The electronic device of claim 11, wherein the second phone number is a phone number of a first sender of the first message, the third phone number is a phone number of a second sender of the second message, and the at least one processor is further configured to execute the instructions to:

provide a call option for making a phone call to the one of the first sender or the second sender.

18. The electronic device of claim 11, wherein the at least one processor is further configured to execute the instructions to:

display communication details related to the one of the second phone number or the third phone number.

19. The electronic device of claim 11, wherein an image is addable to a contact of the selected and stored phone number in the phonebook of the electronic device.

20. A non-transitory computer-readable recording medium having recorded thereon a program, which, when executed by a computer, causes the computer to perform the method of claim 1.

* * * * *